F. A. ERRINGTON.
AUTOMATICALLY OPENING STUD SETTER.
APPLICATION FILED JUNE 28, 1904.
927,028.
Patented July 6, 1909.
2 SHEETS—SHEET 2.
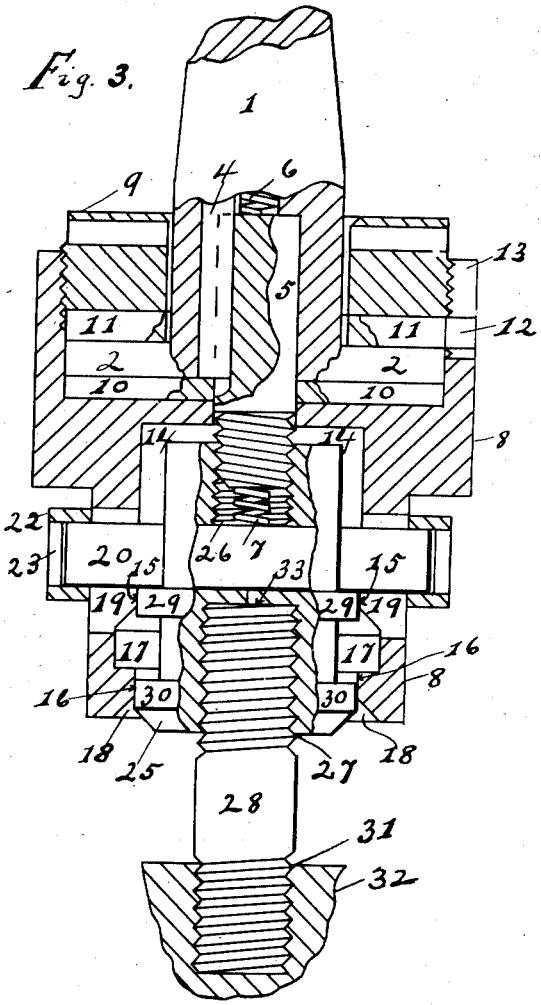
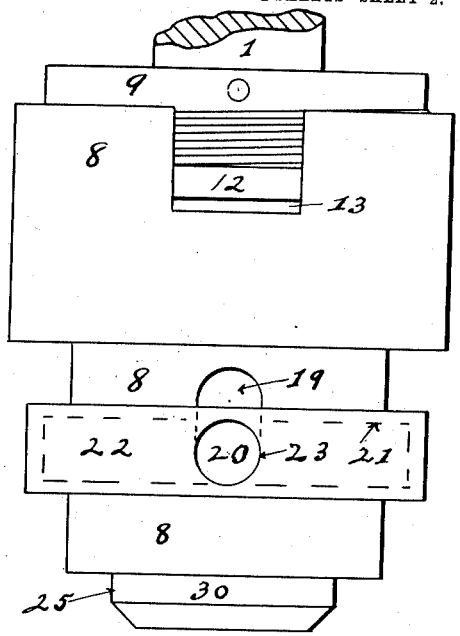
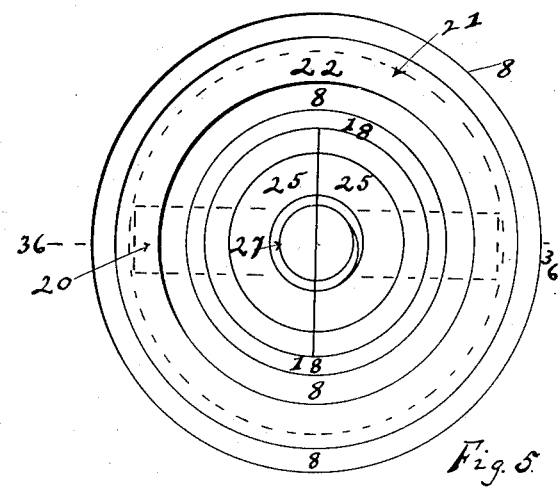
Witnesses
Richard Wilkens
D. J. Wilson
Inventor
Franklin Alfred Errington

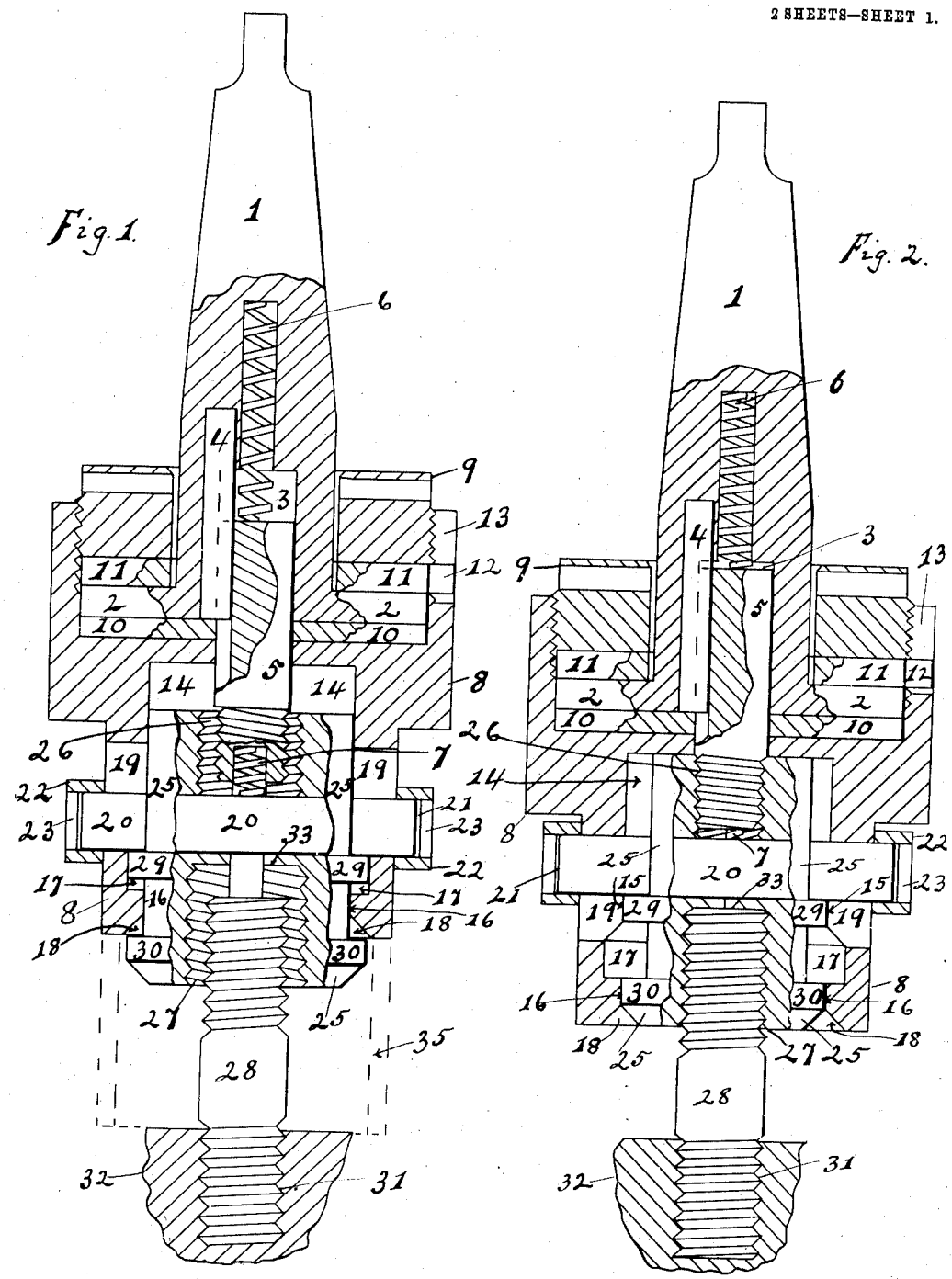

UNITED STATES PATENT OFFICE.

FRANKLIN ALFRED ERRINGTON, OF NEW YORK, N. Y.

AUTOMATICALLY-OPENING STUD-SETTER.

No. 927,028.   Specification of Letters Patent.   Patented July 6, 1909.

Application filed June 28, 1904. Serial No. 214,556.

*To all whom it may concern:*

Be it known that I, FRANKLIN ALFRED ERRINGTON, a citizen of the United States of America, residing in New York city, borough of Richmond, county of Richmond, (postoffice Stapleton,) State of New York, have invented certain new and useful Improvements in Automatically-Opening Stud-Setters, of which the following is a specification.

My invention relates broadly to friction clutches and to means for disengaging a subsidiary clutch by and during the slipping of the members of said primary driving friction clutch; and more particularly to means for setting a stud by an adjustable friction clutch, and disengaging a split-nut clutch from the friction driven member of the friction clutch and from the stud; and the invention further consists in the novel details of improvements and the combinations of parts that will be more fully hereinafter set forth and then pointed out in the claims.

The principal object of my invention is to disengage a friction driven member or body from its ultimately driven part, (such as a shaft, tool or other point of application of the power transmitted through the frictional contact of the driving and driven members of the friction clutch) by and during the independent rotation of the members of said friction clutch, and thereby automatically relieve the strain of the frictional tension at the point of its application, upon the completion of the work or upon the occurrence of any undue strain that would endanger breakage of the mechanism or injury to the device or work; whereas in all previous frictional devices for this purpose the relief was not automatic, but the tension of the frictional drive and the slipping of the frictional surfaces were continuous until relieved by the operator stopping or reversing the machine.

In illustrating the application of my invention to the releasing of a friction clutch from a stud, after setting the stud at the desired tension of the friction clutch, it will be seen that the independent rotation of the members of the friction clutch actuates the means I have shown of opening the split-nut clutch, and thereby automatically releasing the stud from the rotary strain of the driving friction clutch.

Reference is to be had to the accompanying drawings, forming a part hereof, wherein:—

Figure 1 is a vertical cross-section of a device embodying my invention, the parts being illustrated in the open position. Fig. 2 is a similar view of the parts in the working position being a section of Fig. 5 on the line 36; Fig. 3 is a similar view of the parts illustrating them in an intermediate position during their passage from the working to the open position, showing how the jack-screw operates to move the split-nut clutch and the friction driven member axially apart, or along each other during the independent rotation of the driving and driven members of the friction clutch. Fig. 4 is an external view of the device in the open position, but the view is taken after a quarter turn to the right from that shown in Fig. 1, to bring into view the lug and slot of the friction clutch and the slot and clutch-rod that connect the split-nut clutch with the friction driven body. Fig. 5 is an end view of Fig. 2 with the stud removed, and looking at the bottom of the device.

Similar numerals of reference indicate corresponding parts in the several views.

A shank 1 is shown as a suitable means for connection with a drill press or similar machine, the lower end of said shank being preferably provided with a flange 2, which I have utilized as a driving friction disk or member. An axial bore 3 in said shank is shown suitably splined to a shaft or screw 5, to connect said screw 5 to rotate in unison with shank 1 and have limited movement axially thereof. Springs 6 and 7 are preferably placed at opposite ends of the axially movable jackscrew 5, whereby the screw 5 floats between its spring ends. I preferably complete the friction clutch by providing a friction driven body 8 with a screw-threaded cup at its inner end, into which I screw an adjusting nut 9, and I then interpose a fiber washer 10 between the flange 2 and the friction driven body 8, and another fiber washer 11 between the adjusting-nut 9 and the flange 2, this washer 11 being provided with a lug 12 that meshes with a slot 13 cut into the side walls of the screw-threaded cup of body 8 (see Figs. 1 and 4). By this arrangement it will be seen that the adjusting members 8, 9, 11 are all locked to rotate in unison, so that the slipping of the friction driving member 2 will not affect the tension of the frictional contact of the driving and driven members of the friction clutch. Other forms of friction clutches could readily be employed to coact with the features of my invention.

The outer end of body 8 is shown bored out to form an inner clutch-chamber 14, 15, 16 whose opposed side walls provide inner internal thrust-faces at 15 and outer internal thrust-faces at 16 (the terms "inner" and "outer" being taken with respect to their relative locations longitudinally of body 8), said sets of internal thrust-faces being separated from each other by an intervening recess 17, which I preferably term an outer clutch-chamber 17, having reference to the lateral locations of said clutch-chambers relatively to the axis of body 8. A similar lateral escapement or outer clutch-chamber 18 is provided at the mouth of the clutch-chamber 14, 15, 16, each of said outer clutch-chambers 17, 18 extending laterally beyond its associate internal thrust-face 15, 16 respectively, thus subdividing the clutch-chamber 14, 15, 16 according to the functions of its respective sections into a series of inner and outer clutch-chambers 15, 17 and 16, 18 respectively, all being located in line with the axis of body 8. The side walls of clutch-chamber 14, 15, 16 are shown pierced by opposing slots 19, through which project the ends of a clutch-bar or key 20, the ends of which engage into a concentric groove 21 in a ring 22 that surrounds the body 8. Openings 23 in ring 22 permit the entrance and exit of the clutch-bar 20. The clutch-bar 20 passes through a split-nut clutch 25 which is located in clutch-chamber 14, the sections of said split-nut clutch 25 being connected together by clutch-bar 20 to rotate in unison with body 8, and this connection also permits the free axial movement of the split-nut clutch 25, the bar 20 and ring 22 along the body 8. The inner end of split-nut clutch 25 is shown provided with a screw threaded bore 26 to mesh with the jack-screw 5, and the outer end of said split-nut clutch 25 has been illustrated as having an internally screw-threaded socket 27 to mesh with a screw-stud or other ultimately driven part, tool, shaft or piece of work 28.

The split-nut clutch 25 is provided with a series of projections and indentures upon its periphery, the outer surfaces of the projections providing inner external thrust-faces 29 and outer external thrust-faces 30, so designated with reference to their respective locations longitudinally of body 8, said external thrust-faces being shown located in line to form a double-bearing of said split-nut clutch upon the double set of internal thrust-faces 15, 16 of the inner clutch-chamber 14, 15, 16. The difference between the extreme diameter of the split-nut clutch 25 at its external thrust-faces 29, 30 and the mean diameter of said split-nut clutch on either side of said external thrust-faces is sufficient to permit the internally threaded faces 26, 27 of the split-nut 25 to clear the threads of the jack-screw 5 and the screw-stud 28 upon the external thrust-faces 29, 30 of the split-nut 25 passing out of line with the internal thrust-faces 15, 16 of the body 8 and expanding into the outer clutch-chambers 17, 18 provided for their reception, when the sections of split-nut clutch 25 move radially of body 8 into the open position see Fig. 1). The multiple bearing of each section of the split-nut clutch 25 upon the side walls of the inner clutch 25 upon the side walls of the inner clutch-chamber 14, 15, 16 thus obtained for its multiple external thrust-faces 29, 30 maintains the two sections of the split-nut clutch parallel with each other and their internally screw-threaded portions 26, 27 at all times parallel with the externally screw-threaded portions of the jack-screw 5 and stud 28. This maintenance of the alinement of all the coacting movable parts being particularly necessary for the proper reassembling of these parts from the open to the closed positions, I have preferably shown the inner and outer clutch-chambers as separated from each other by sloping steps or cam-faces leading from 15 to 17 and from 16 to 18, so that upon suitable inward axial pressure being applied to the axially movable parts, the multiple bearing of the inner and outer external thrust-faces 29, 30 simultaneously upon the aforesaid multiple cam-faces or sloping steps, not only coacts to move the two sections of the split-nut clutch 25 inwardly toward each other (thereby removing the projections 29, 30 from the outer clutch-chambers 17, 18 and bringing the external thrust-faces 29, 30 into line with the internal thrust-faces 15, 16), but, by exerting said inward lateral pressure simultaneously at each end of each section of the split-nut clutch 25 the alinement of the intermeshing screw-threaded portions of jack-screw 5 and split-nut clutch 25 is assured during the reassembling of all the axially movable parts.

It will be seen that the bore 26 at the inner end of the split-nut 25 has been shown as threaded left hand, to correspond with the threads on the jack-screw 5; and that the bore 27 at the outer end of the split-nut 25 has been shown threaded right hand to mesh with the usual right hand stud, the intention being to rotate the shank 1 to the right.

It being assumed that the shank 1 is attached to the longitudinally movable spindle of a lever-feed drill press as usually constructed, by which the operator can readily raise or lower the device to or from the work. The operation of the device may be described as follows:—The tension of the frictional contact of the driving and driven friction members 2, 8 being adjusted by screwing the adjusting-nut 9 into the body 8, and the shank 1 being rotated to the right hand, the parts will be in open position illustrated in Fig. 1. It being customary to screw by hand the stud 28 a few threads into the hole 31 tapped into a piece of work 32, the operator pushes the ring 22 inwardly of the body 8, bringing the split-nut 25 and jack-screw 5 up into the working position shown in Fig. 2, through the medium of the clutch-bar 20, whose ends run around in the concentric groove provided in ring 22 for that purpose, the ring 22 remaining stationary in the hand of the operator, while all the other parts of the device rotate. The device is now brought down upon the stud 28, which screws up into the bore 27 until the upper end of the stud 28 abuts against the abutment 33 provided at the inner end of the screw-threaded bore 27. The stud 28 will now be firmly clamped to body 8 by the split-nut clutch 25, and the continued rotation of the device will screw the stud 28 down into the tapped hole 31 until the lower end of the stud 28 strikes the bottom of the hole 31, whereupon the tension of the frictional contact of the driving and driven friction members 2, 8 will be overcome, and they will immediately commence to rotate independently, which operates to turn the left hand threaded jack-screw 5 out of the correspondingly threaded bore 26 of the split-nut clutch 25. The cessation of rotation of body 8, due to the independent rotation of the friction members, will act as a signal to the operator to attempt to raise the drill press spindle, and thereby leaves the body 8 free to be pushed upward by the jack-screw 5, and the inward axial movement of jack-screw 5 being limited by its abutment against the inner end of the bore 3 in shank 1, it will be seen that the continued rotation of the members 2, 8 of the friction clutch will enable jack-screw 5 to move the split-nut clutch 25 and the body 8 axially apart, (see Fig. 3) bringing the external thrust-faces 29, 30 of the split-nut clutch 25 out of line with the internal thrust-faces 15, 16 of the body 8, whereupon the sections of the split-nut clutch 25 will immediately open radially, by its projecting external thrust-faces 29, 30 expanding into the outer clutch-chambers 17, 18, and the split-nut clutch 25 will thereby be disconnected from the stud 28, which will be left standing in the work. Simultaneously with the releasing of the stud 28, the threads of the bore 26 are cleared from the jack-screw 5, whose spring 6 pushes the screw 5 to the position shown in Fig. 1, where the elastic stop 7 at the other end of screw 5 prevents the screw 5 from jamming against the clutch-bar 20 upon the reassembling of the parts into the driving position shown in Fig. 2, whereas this spring 7 permits the screw-threads of the screw 5 to yield axially sufficiently to insure their ready intermeshing with the screw-threads of the bore 26 of split-nut 25. It will thus be seen that I have overcome the difficulty of getting back into place without resistance, all the parts that exerted the pressure necessary to disconnect the clutch 25.

Where it is not desired to set a stud by the tension of a friction clutch, my invention can be used in the simple form of a positive stud-setter. To accomplish this I may employ a piece of tubing 35, as indicated by dotted lines in Fig. 1, in which case it is the axial movement of the stud into the hole 31 in the work that moves the split-nut clutch 25 and body 8 apart axially pulling the external thrust-faces 29, 30 of the split-nut clutch out of line with the internal thrust-faces 15, 16 of the body, to permit the split-nut clutch to expand to release the stud. The difficulty with a positively driven stud-setter is that it may leave the stud loose in the hole that is too deep, or break off a stud in a hole that is not deep enough; so it will be seen how valuable my automatic frictional-opening device is, compared to using only the positive portion of the device illustrated. However, in many cases where small studs are put in, the body 8 and the split-nut clutch can be simply pulled apart by the operator raising the device off the stud when he sees that the stud has reached the desired depth.

Having now described my invention, what I claim is:—

1. The combination with a friction driving member, a friction driven member, an adjustable clamp to press the parts together, and a clutch to connect the friction driven member with an ultimately driven part, of means actuated by the driving friction member to disconnect said clutch during the independent rotation of the driving and driven friction members, substantially as described.

2. The combination with a friction driving member, a friction driven member, an adjustable clamp, and a clutch to connect the friction driven member with an ultimately driven part, of a screw actuated by the driving friction member and meshing with screw-threads carried by said clutch to move said parts axially apart to disconnect said clutch during the independent rotation of the driving and driven friction members, substantially as described.

3. The combination with a friction driving member, a friction driven member, an adjustable clamp, and a screw connected to rotate with said friction driving member and having a limited movement axially thereof, of a split-nut clutch adapted to mesh with said screw, means to hold said split-nut clutch in mesh with said screw, and means to permit said split-nut clutch to expand radially to permit the threads of said screw and of said split-nut clutch to pass freely by each other, substantially as described.

4. The combination with a friction driving member, a friction driven member, an adjustable clamp, and a screw connected to rotate in unison with said friction driving member and having a limited movement axially thereof, of a clutch to connect said friction driven member with an ultimately driven part, said clutch and said friction-driven member being adapted to be moved axially apart by said screw during the independent rotation of said driving and driven friction members to disconnect said ultimately driven part from said friction driven member, substantially as described.

5. The combination with a friction driving member, a friction driven member, an adjustable clamp, and a jack-screw connected to rotate in unison with said friction driving member and having a limited movement axially thereof, of a split-nut clutch adapted to mesh with said screw, means to hold said split-nut clutch in mesh with said screw, means to permit said split-nut clutch to expand radially to clear the threads of said screw, a spring to move said jack-screw axially outward and an elastic stop to suspend the outward movement of said screw, to insure that the screw-threads of the jack-screw and split-nut clutch will remesh substantially as described.

6. The combination with a friction driving member, a friction driven member, an adjustable clamp, and a jack-screw connected to rotate in unison with said friction driving member and having a limited movement axially thereof, of a screw-threaded split-nut clutch adapted to connect a screw-threaded stud with said friction driven member, said jack-screw being adapted to move said split-nut clutch and said friction-driven member axially apart during the independent rotation of said friction driving and driven members, and means to permit said split-nut clutch to expand radially to release said stud from said friction driven member, substantially as described.

7. The combination with a friction driving member; a friction driven member having inner and outer clutch-chambers located in line, the side walls of the inner clutch-chamber providing internal thrust-faces and the outer clutch-chamber providing a lateral escapement beyond each associate internal thrust-face; and a jack-screw connected to rotate in unison with the friction driving member and having a limited movement axially thereof; of a split-nut clutch provided with external thrust-faces adapted to bear upon said internal thrust-faces during operation, said jack-screw being adapted to move said split-nut clutch and said friction driven member axially apart to bring said external thrust-faces out of line with said internal thrust-faces to permit the split-nut clutch to expand radially, substantially as described.

8. The combination with a body having inner and outer clutch-chambers located in line, the side walls of the inner clutch-chamber providing internal thrust-faces and the outer clutch chamber providing a lateral escapement beyond each associate internal thrust-face, of a split-nut clutch having an internally screw-threaded socket provided with an abutment to receive the thrust of a stud meshing with said screw-threads, said split-nut clutch being provided with external thrust-faces adapted to bear upon said internal thrust-faces during operation, and said split-nut clutch being movable axially of said body to bring its external thrust-faces out of line with said internal thrust-faces to permit said split-nut clutch to expand radially, substantially as described.

9. The combination with a body having inner and outer clutch chambers located in line, the side walls of the inner clutch-chamber providing internal thrust-faces and the outer clutch-chamber providing a lateral escapement beyond each associate internal thrust-face, of a split-nut clutch having an internally screw-threaded socket provided with an abutment to receive the thrust of a stud meshing with said screw-threads, said split-nut clutch being provided with external thrust-faces adapted to bear upon said internal thrust-faces during operation, and means to move said split-nut clutch and said body axially apart to disengage said thrust-faces to permit said split-nut clutch to expand radially, substantially as described.

10. The combination with a friction driven member having a clutch-chamber whose side walls provide a series of inner and outer internal thrust-faces located in line and separated from each other by an intervening recess, an internally screw-threaded split-nut clutch connected to rotate in unison with the friction driven member and axially movable along said clutch-chamber, a driving friction member, an adjustable clamp to press said friction members together, and a jack-screw adapted to mesh with said split-nut clutch and connected to rotate in unison with said driving friction member and to have limited movement axially thereof during the independent rotation of said friction members relatively to each other to move said split-nut clutch and said friction driven member axially along each other from the closed to the open position, the periphery of each section of the split-nut clutch being provided with a series of projections and indentures adapted to interlock with the corresponding side walls of the clutch-chamber when the split-nut clutch is in the open position, the outer surfaces of said projections of the split-nut clutch providing inner and outer external thrust-faces located in line and adapted to secure a multiple bearing for each section of said split-nut clutch upon the side walls of said clutch-chamber to preserve the alinement of the sections of the split-nut clutch with each other and with said jack-screw during the axial and lateral movement of said parts relatively to each other, substantially as described.

FRANKLIN ALFRED ERRINGTON.

Witnesses:
 RICHARD WILKENS,
 D. J. WILSON.